United States Patent
Pierre et al.

(10) Patent No.: US 12,008,109 B2
(45) Date of Patent: Jun. 11, 2024

(54) CLOUD BASED BOOT INTEGRITY

(71) Applicant: Dell Products L.P., Hopkinton, MA (US)

(72) Inventors: Jean Pierre, Brockton, MA (US); Carol Sheridan, Littleton, MA (US); Shruti Shetty, Braintree, MA (US); Azzam Tannous, Framingham, MA (US); Massarrah Tannous, Bellingham, MA (US); Huijun Xie, Hopkinton, MA (US)

(73) Assignee: Dell Products L.P., Hopkinton, MA (US)

( * ) Notice: Subject to any disclaimer, the term of this patent is extended or adjusted under 35 U.S.C. 154(b) by 166 days.

(21) Appl. No.: 17/577,420

(22) Filed: Jan. 18, 2022

(65) Prior Publication Data

US 2023/0229777 A1 Jul. 20, 2023

(51) Int. Cl.
*G06F 9/4401* (2018.01)
*G06F 21/57* (2013.01)

(52) U.S. Cl.
CPC .......... *G06F 21/575* (2013.01); *G06F 9/4416* (2013.01); *G06F 2221/034* (2013.01)

(58) Field of Classification Search
CPC . G06F 21/575; G06F 9/4416; G06F 2221/034
USPC ........................................................ 713/187
See application file for complete search history.

(56) References Cited

U.S. PATENT DOCUMENTS

| | | | | |
|---|---|---|---|---|
| 5,892,906 | A * | 4/1999 | Chou | G06F 21/88 726/19 |
| 6,625,730 | B1 * | 9/2003 | Angelo | G06F 11/1417 713/1 |
| 10,073,966 | B2 * | 9/2018 | Oberg | G06F 21/51 |
| 2006/0093286 | A1 * | 5/2006 | Dybsetter | H04B 10/40 385/92 |
| 2008/0126779 | A1 * | 5/2008 | Smith | G06F 21/575 713/2 |
| 2008/0263345 | A1 * | 10/2008 | Booth | G06F 21/572 713/2 |
| 2014/0130188 | A1 * | 5/2014 | Baryudin | G06F 21/44 726/29 |
| 2014/0298026 | A1 * | 10/2014 | Isozaki | H04L 9/0897 713/171 |
| 2021/0173669 | A1 * | 6/2021 | Zhang | G06F 9/4411 |
| 2022/0210164 | A1 * | 6/2022 | Lim | H04L 63/0435 |

* cited by examiner

*Primary Examiner* — Badri Narayanan Champakesan
(74) *Attorney, Agent, or Firm* — Anderson Gorecki LLP (57) ABSTRACT

Boot integrity of a storage platform is verified by comparing observed boot data values with expected boot data values stored in a secure remote cloud. The boot data values include hashes of software that runs at each stage of a boot sequence, e.g., BIOS, bootloader, kernel, and runlevel programs. The observed boot data values may be provided by a TPM using an AIK and nonce. If the observed boot data values fail to match the expected boot data values then a boot integrity service running on the storage platform limits functionality such as by disabling IO services, disabling remote data replication, enabling a diagnostic service, enabling a data collection service, disabling access by non-service accounts, and protecting a management database.

20 Claims, 5 Drawing Sheets

CLOUD BASED BOOT INTEGRITY

TECHNICAL FIELD

The subject matter of this disclosure is generally related to cybersecurity, and more particularly to verification of boot integrity.

BACKGROUND

A variety of cybersecurity attacks are known, including man-in-the-middle, denial-of-service, SQL injection, zero-day exploits, cross-site scripting, and rootkits. Rootkit attacks typically involve insertion of malicious code during the boot sequence. Kernel rootkits and bootloader rootkits modify or replace the kernel or bootloader. Rootkit attacks are difficult to detect because they occur before anti-malware programs are loaded. Furthermore, a successful rootkit attack can give the attacker extensive control over the attacked platform.

SUMMARY

In accordance with some implementations, an apparatus comprise: a storage platform comprising at least one compute node comprising at least one general purpose processor, memory, a secure cryptoprocessor, non-volatile storage, and a boot integrity service loaded during a boot sequence, the boot integrity service configured to: obtain, from the secure cryptoprocessor, observed boot data values comprising hashes of firmware and software that run during the boot sequence; provide the observed boot data values to a remote verifier for comparison with expected boot data values; and responsive to a control command from the remote verifier generated in response to mismatch between the observed boot data values and the expected boot data values, limit functionality of the storage platform.

In accordance with some implementations, a method is implemented in a storage platform that comprises at least one compute node with at least one general purpose processor, memory, a secure cryptoprocessor, and non-volatile storage, the method comprising: obtaining, from the secure cryptoprocessor, observed boot data values comprising hashes of firmware and software that run during the boot sequence; providing the observed boot data values to a remote verifier for comparison with expected boot data values; and responsive to a control command from the remote verifier generated in response to mismatch between the observed boot data values and the expected boot data values, limiting functionality of the storage platform.

In accordance with some implementations, a non-transitory computer-readable storage medium stores instructions that when executed by a compute node cause the compute node to perform a method for checking boot integrity, the method comprising: obtaining, from a secure cryptoprocessor, observed boot data values comprising hashes of firmware and software that run during a boot sequence; providing the observed data to a remote verifier for comparison with expected boot data values; and responsive to a control command from the remote verifier generated in response to mismatch between the observed boot data values and the expected boot data values, limiting functionality of the compute node.

This summary is not intended to limit the scope of the claims or the disclosure. Other aspects, features, and implementations will become apparent in view of the detailed description and figures, and all the examples, aspects, implementations, and features can be combined in any technically possible way.

DETAILED DESCRIPTION

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" are used to refer to features that are abstractions of other features, for example, and without limitation, abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
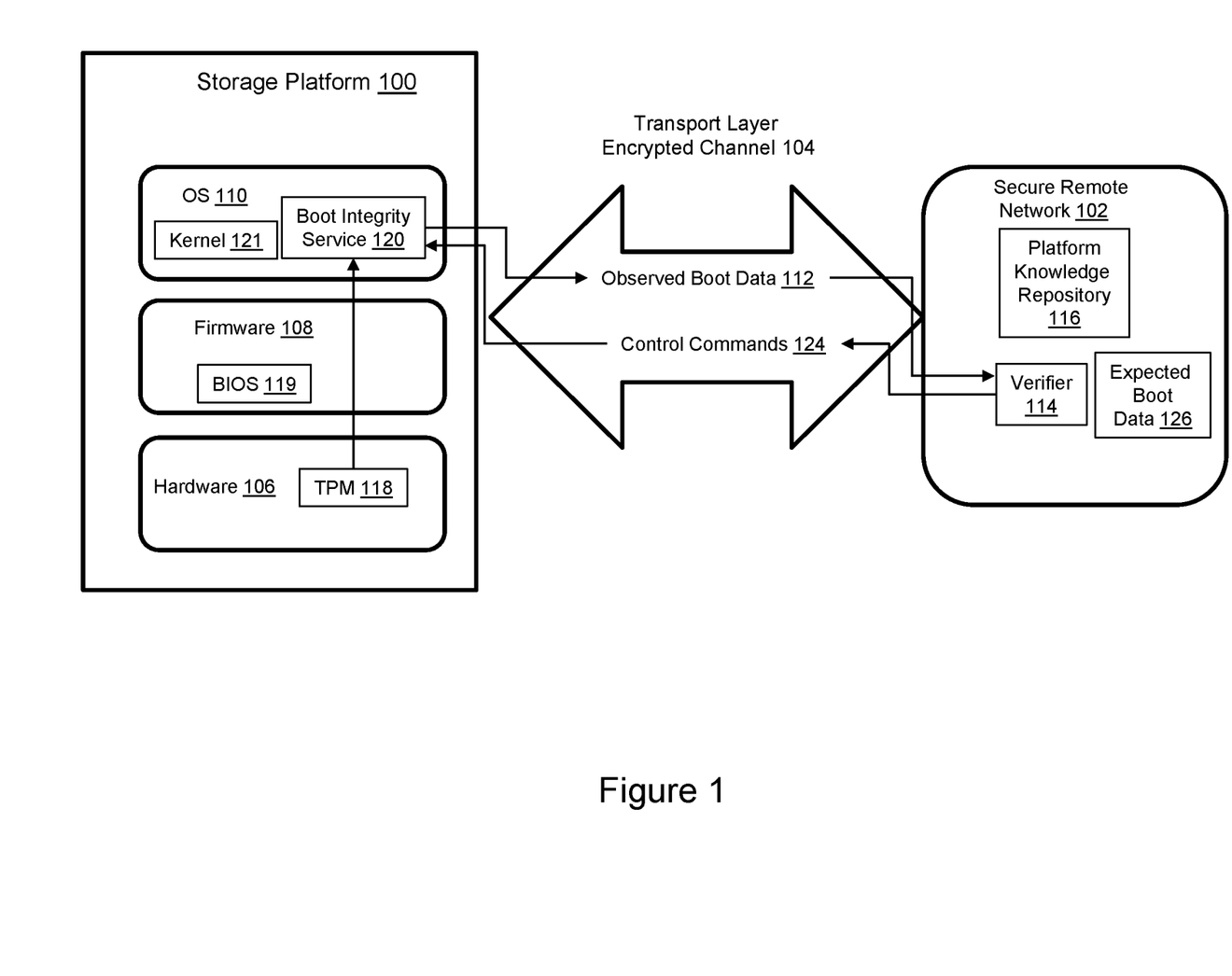
FIG. 1 illustrates a cloud-based boot integrity check.

FIG. 1 illustrates a cloud-based boot integrity check. The boot integrity check is performed between a boot integrity service 120 that runs on a storage platform 100 and a verifier 114 that runs on a secure remote network 102. The secure remote network may be a secure cloud. The storage platform is not within the secure remote network. The storage platform 100 includes hardware 106, firmware 108, and an operating system (OS) 110. The hardware 106 includes processors, memory, and a trusted platform module (TPM) 118. The TPM is a standards-compliant secure cryptoprocessor that is capable of performing a variety of security-related functions including key attestation. The firmware 108 may include one or more of read-only memory (ROM), erasable programmable read only memory (EPROM), or flash. The basic input/output system (BIOS) 119 is maintained on the firmware 108. The OS 110 includes a kernel 121 that is loaded from non-volatile storage into memory during each boot sequence. The boot integrity service 120 runs as an agent or may be integrated with the OS 110 of the storage platform.

A platform knowledge repository 116 is maintained on the secure remote network 102. The platform knowledge repository contains expected boot data values for multiple platforms such as host servers, NAS servers, SAN nodes, storage arrays, and a wide variety of computing devices, including expected boot data values 126 for the storage platform 100. The expected boot data values are calculated and stored before the associated platform, e.g., storage platform 100, is deployed in service. Consequently, the expected boot data values are calculated before the platform has been subjected to cyberattack. The expected boot data values may be calculated and stored by the manufacturer of the storage platform 100 as part of the manufacturing process before the storage platform is delivered to customer premises. Because the expected boot data values are calculated before any cyberattacks have occurred, and because the expected boot data values are stored on a secure remote network, the expected boot data values are a trusted as being representative of a valid boot sequence.

In response to booting of the storage platform 100, the TPM 118 obtains observed boot data values 112 that represent the current boot sequence, The observed boot data values are provided to the boot integrity service 120. More specifically, the observed boot data values are stored in platform configuration registers (PCR) and provided in a TPM quote that will be described below. The observed boot data values 112 are provided to the verifier 114 in encrypted form via a transport layer encrypted channel 104. The verifier 114 compares the observed boot data values 112 with the corresponding expected boot data values 126 for the storage platform 100, which are retrieved from the platform knowledge repository 116. Based on the results of the comparison, control commands 124 may be sent from the verifier 114 to the boot integrity service 120 via the transport layer encrypted channel 104. For example, an indication of boot integrity confirmation may be sent in response to a match between the observed boot data values 112 with the corresponding expected boot data values 126. In contrast, commands to limit potential damage from a rootkit attack may be sent in response to a mismatch between the observed boot data values 112 and the corresponding expected boot data values 126. Specific examples of such control commands 124 and/or actions taken by the boot integrity service 120 include one or more commands that cause the storage platform to stop replication of data to secondary storage, disconnect host front end connectivity, enable a service mode with service account access only, enable a diagnostic service, enable a data collection service, shut down file system service, shut down block storage service, protect the management database, and restrict management connectivity, alone or in any combination.

Figure 2:
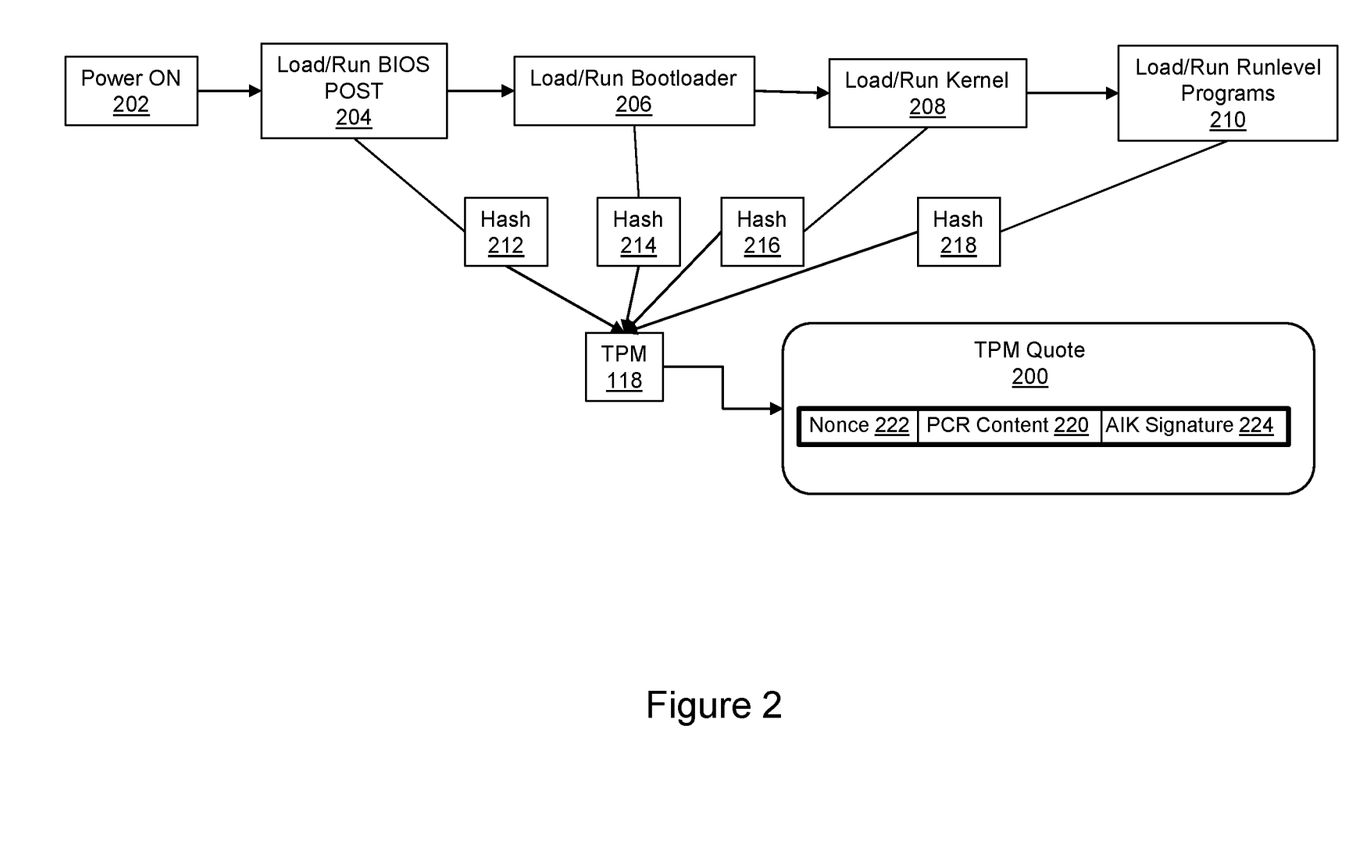
FIG. 2 illustrates TPM quote generation.

FIG. 2 illustrates generation of a TPM quote 200 with observed boot data values. The boot sequence of the storage platform includes four distinct stages following power ON 202, namely, load/run BIOS 204, load/run bootloader 206, load/run kernel 208, and load/run runlevel programs 210. A hash of the running programs is generated and provided to the TPM 118 at each of the stages. Hash 212 uniquely represents the programs running at load/run BIOS POST 204, hash 214 uniquely represents the programs running at load/run bootloader 206, hash 216 uniquely represents the programs running at load/run kernel 208, and hash 218 uniquely represents the programs running at load/run runlevel programs 210. The hashes 212, 214, 216, 218, which are part of the observed boot data values, are included in the TPM quote 200 as PCR content 220. A nonce 222, which is a random number generated by the verifier, is included in the TPM quote as protection against replay attacks. An AIK signature 224 includes an attestation identity key that is used by the verifier to assure that the TPM 118 is the source of the TPM quote 200. The TPM quote is provided to the verifier by the boot integrity service.

Figure 3:
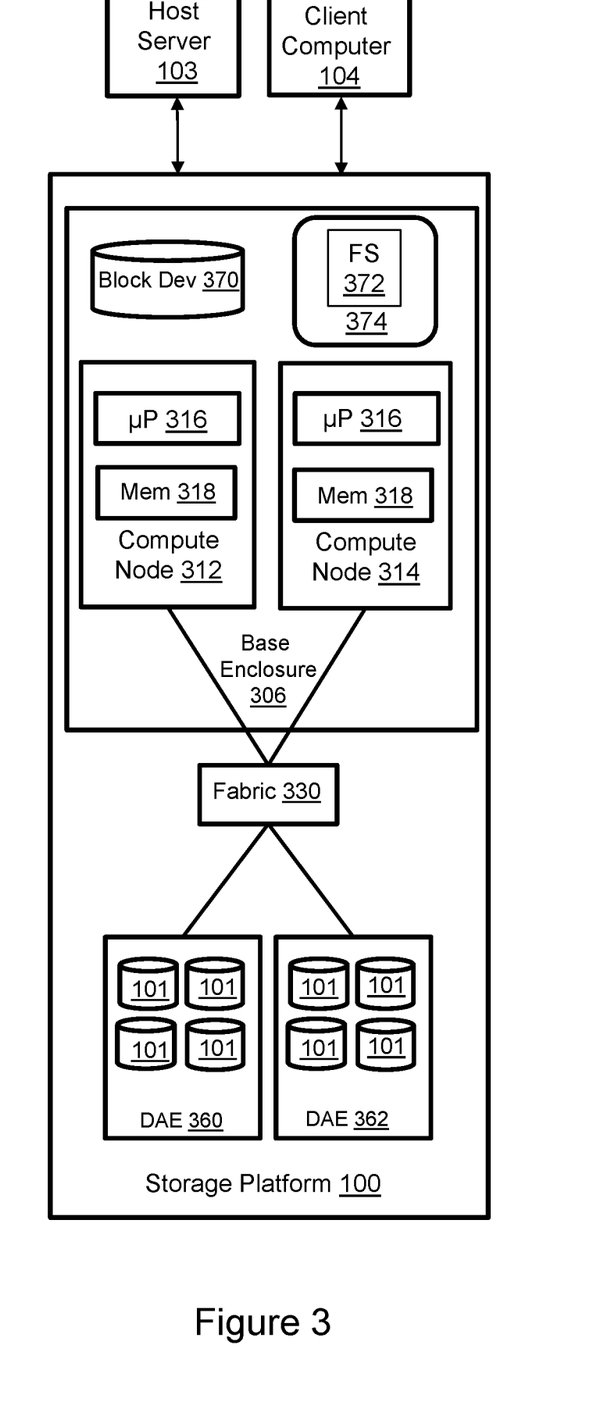
FIG. 3 illustrates the storage platform in greater detail.

FIG. 3 illustrates the storage platform 100 in greater detail. The inventive concepts may be implemented on a wide variety of computing and storage platforms so the illustrated storage platform is provided for context and should not be viewed as limiting. The storage platform 100 is depicted in a simplified data center environment supporting a host server 103 and a client computer 104. The host server and client computer may include volatile memory, non-volatile storage, and one or more tangible processors that support instances of a host application, as is known in the art. The storage platform 100 includes one or more base enclosures 306 and one or more disk array enclosures (DAEs) 360, 362. Each DAE includes managed drives 101. Each base enclosure 306 includes two compute nodes 312, 314. Each compute node may be implemented as a separate printed circuit board (PCB) or blade and includes resources such as at least one multi-core processor 316 and local memory 318. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each compute node includes one or more front-end adapters for communicating with host servers and client computers. Each front-end adapter has ports, memory, and processing resources for servicing input-output commands (IOs) from the host servers and client computers. Each compute node may also include one or more disk adapters for communicating with managed drives 101 in the DAEs 360, 362 via a fabric 330. Each disk adapter has processors, memory, and ports via which the compute node may access the DAEs for servicing IOs. The managed drives 101 include non-volatile storage media that may be of any type, e.g., solid-state drives (SSDs) based on EEPROM technology such as NAND and NOR flash memory and hard disk drives (HDDs) with spinning disk magnetic storage media. Disk controllers may be associated with the managed drives as is known in the art. The interconnecting fabric 330 enables implementation of an N-way active-active backend. In some implementations, every disk adapter can reach every DAE via the fabric 330.

Managed data is persistently stored on the managed drives 101, but those drives are not discoverable by the host server 103 and client computer 104. To make the managed data accessible to the host server 103 in a SAN mode, the storage platform 100 creates logical storage objects that can be discovered. Without limitation, logical storage objects may be referred to as volumes, devices, or LUNs, where a logical unit number (LUN) is a number used to identify logical storage volumes in accordance with the small computer system interface (SCSI) protocol. Storage objects that can be discovered and accessed by the host server are identified by the term "production," e.g., a production volume, production device, or production LUN. In the illustrated example there is a block-based production device 370. From the perspective of the host server 103, the block-based production device 370 is a single disk having a set of contiguous fixed-size logical block addresses (LBAs) on which data used by the instances of a host application running on the host server resides. However, host application data is stored at non-contiguous addresses on various managed drives 101. The compute nodes maintain metadata that maps between the LBAs of the block-based production device 370 and physical addresses on the managed drives 101 in order to process IOs from host servers. To make the managed data accessible to the client computer 104 in a NAS mode, a filesystem 372 may be hosted by a container or virtual machine 374. The filesystem includes metadata that indicates locations of data on the managed drives 101 but, unlike with the LBAs of the block-based production device, the filesystem 372 identifies higher level data structures such as files and database objects so IOs from the client computer can reference those higher-level data structures rather than LBAs.

Figure 4:
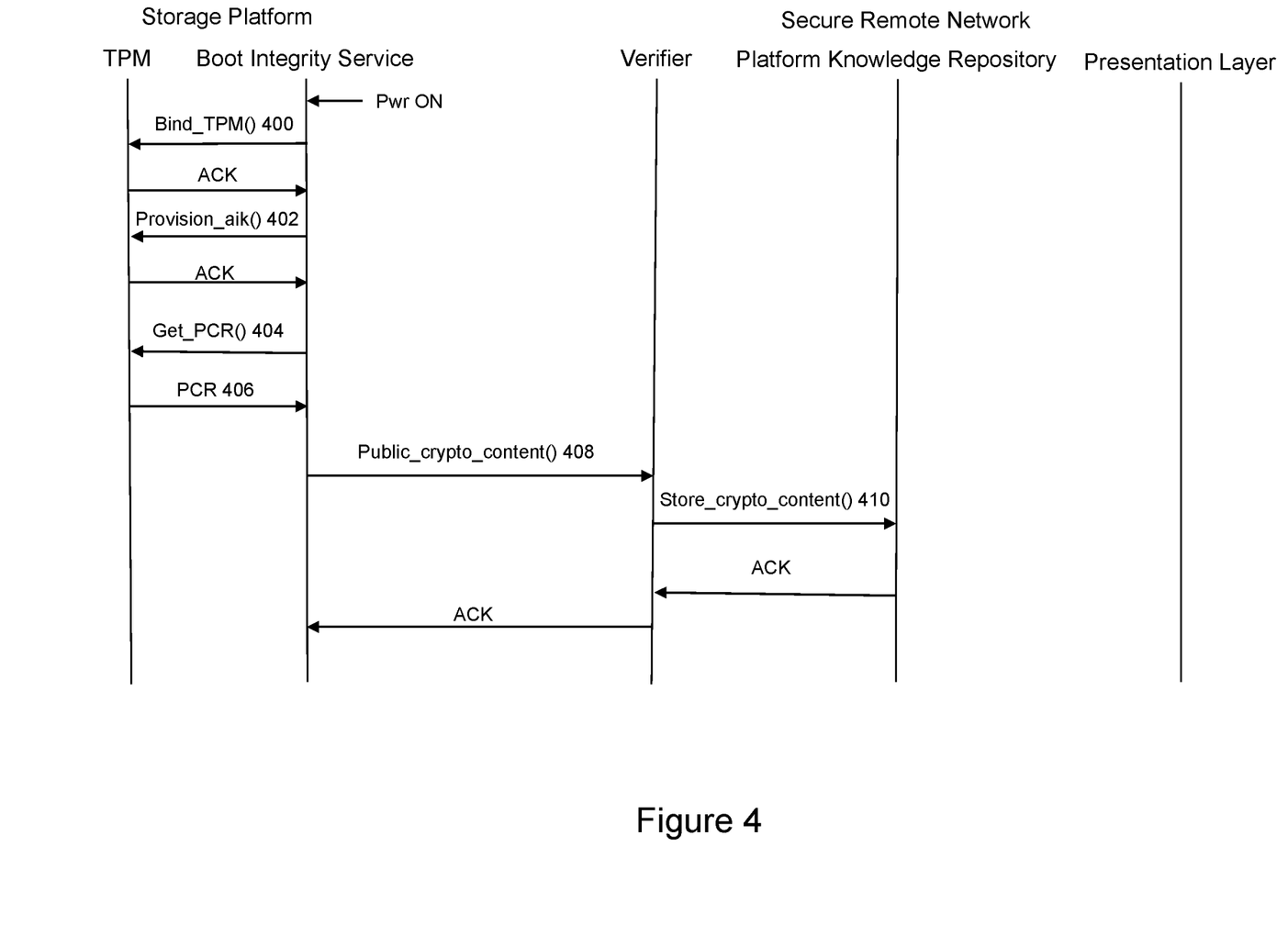
FIG. 4 is a flow diagram that illustrates generation of expected boot data values.

FIG. 4 is a flow diagram that illustrates generation of the expected boot data values. The illustrated steps may be performed before the storage platform has been exposed to possible cyberattack. For example, the steps may be performed during the manufacturing process, before the storage platform has been delivered to the customer or deployed into service. Following power ON, the boot integrity service of the storage platform binds with the TPM as indicated in step 400. An ACK is returned by the TPM. The boot integrity service then causes an attestation integrity key (AIK) to be provisioned as indicated in step 402. An ACK is returned by the TPM. The boot integrity service then sends a command to the TPM to obtain the PCR content (boot sequence hashes) as indicated in step 404. The PCR content is returned by the TPM as indicated in step 406. The PCR content is provided from the boot integrity service to the verifier as public key encrypted content as indicated in step 408. The verifier receives the encrypted content and stores it in the platform knowledge repository as indicated in step 410. ACKs are returned from the platform knowledge repository to the verifier and from the verifier to the boot integrity service. The secure remote network is outside the customer network in which the storage platform will eventually be deployed.

Figure 5:
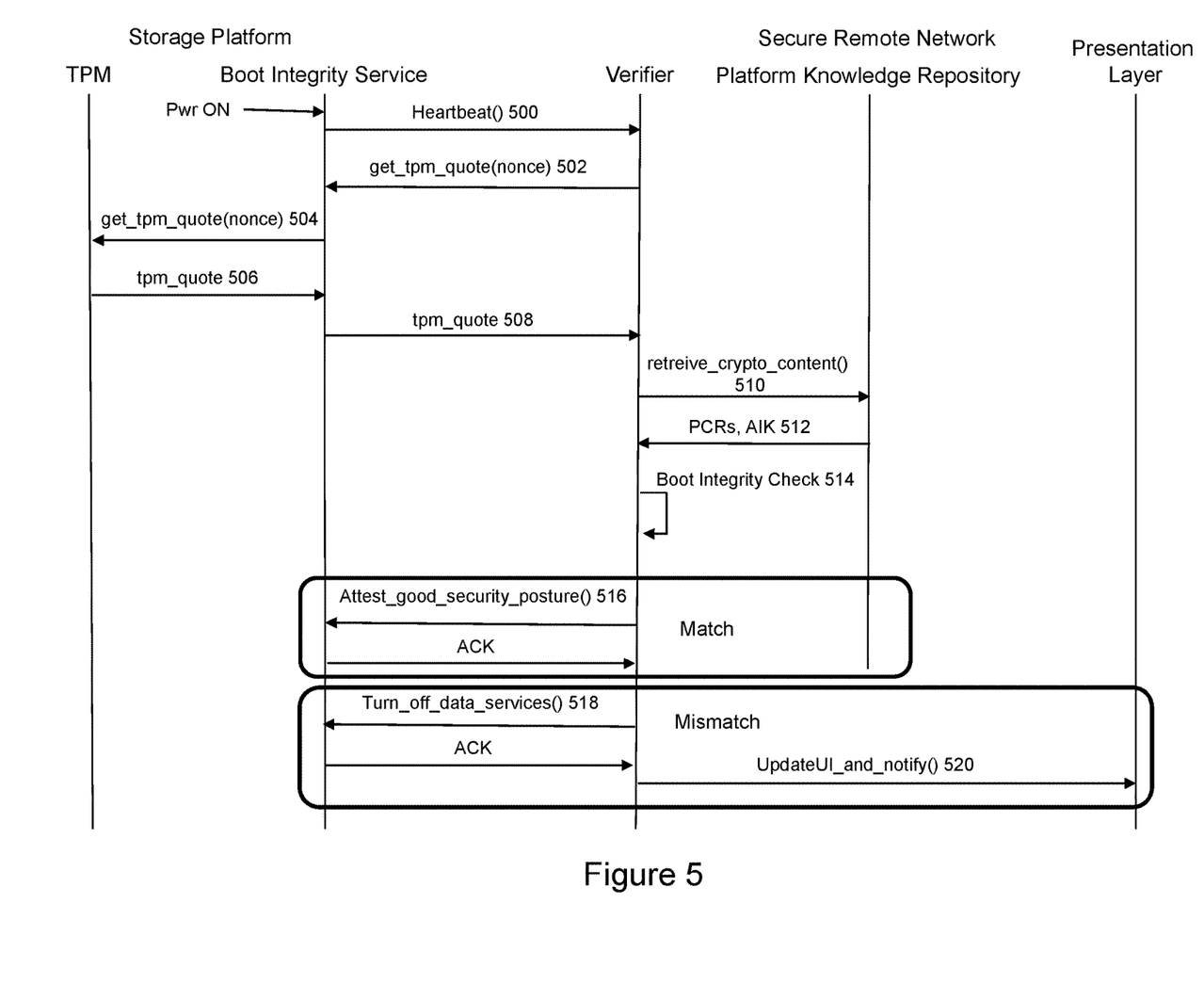
FIG. 5 is a flow diagram of steps associated with performing a cloud-based boot integrity check.

FIG. 5 is a flow diagram of steps associated with performing a cloud-based boot integrity check. Following power ON, a heartbeat is signaled from the boot integrity service to the verifier as indicated in step 500. The new heartbeat indicates that a boot sequence has been initiated. In response to receipt of the heartbeat, the verifier signals to the boot integrity service to get a TPM quote as indicated in step 502. The signal includes a nonce that is generated for the specific boot integrity check instance and is not reused. In response to the signaling from the verifier, the boot integrity service signals to the TPM to obtain a TPM quote as indicated in step 504. The signal includes the nonce. In response, the TPM assembles and provides a TPM quote as indicated in step 506. The TPM quote includes the nonce, PCR values calculated for the current boot sequence, and the AIK. The TPM quote is sent from the boot integrity service to the verifier as indicated in step 508. In response, the verifier signals to the platform knowledge repository to obtain the previously stored crypto content with the expected PCR values and AIK as indicated in step 510. The platform knowledge repository returns the PCR values and AIK as indicated in step 512. The verifier then performs a boot integrity check as indicated at step 514. The verifier uses the AIKs to validate the signature of the TPM quote. The nonce is matched to verify that the TPM quote is not a copy of a previous TPM quote, e.g., as in a replay attack. The verifier compares the PCR values retrieved from the platform knowledge repository with the PCR values from the TPM quote. For example, individual hash values of each boot sequence step may be compared. A match is found if the nonce values match, the signature of the TPM quote is validated, and all the corresponding PCR values match. In the case in which a match is found, the verifier signals to the boot integrity service to attest good security posture as indicated in step 516. An ACK is returned by the boot integrity service. In the case in which a match is not found, the verifier signals to the boot integrity service to disable data services as indicated in step 518. Specific data services to be disabled may be identified or the boot integrity service may be configured to disable specific data services in response to a signal indicative of mismatch. Examples of data services that may be disabled include replication of data to secondary storage, host front end connectivity, file system service, and block storage service, alone or in any combination. The boot integrity service may also initiate diagnostics, restrict account access to the storage platform, and protect critical data and metadata. Further, the verifier signals to the presentation layer to provide notification of the mismatch as indicated in step 520.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. An apparatus comprising: a storage platform comprising at least one compute node comprising at least one general purpose processor, memory, a secure cryptoprocessor, non-volatile storage, and a boot integrity service loaded during a boot sequence, the boot integrity service configured to: obtain, from the secure cryptoprocessor, observed boot data values comprising:
   a first hash that uniquely represents programs running at load/run BIOS POST;
   a second hash that uniquely represents programs running at load/run bootloader;
   a third hash that uniquely represents programs running at load/run kernel; and
   a fourth hash that uniquely represents the programs running at load/run runlevel programs;
   provide the observed boot data values comprising the first, second, third and fourth hashes as part of platform configuration register content included within a trusted platform quote along with a nonce and an attestation integrity key (AIK) signature, to a remote verifier in a secure remote network that does not contain the storage platform for comparison with expected boot data values; and
   responsive to a control command from the remote verifier generated in response to mismatch between the observed boot data values and the expected boot data values, limit functionality of the storage platform.

2. The apparatus of claim 1 wherein the boot integrity service is configured to return a nonce with the observed boot data values provided to the remote verifier.

3. The apparatus of claim 1 wherein the boot integrity service is configured to limit functionality of the storage platform by disabling IO services.

4. The apparatus of claim 1 wherein the boot integrity service is configured to limit functionality of the storage platform by disabling remote data replication.

5. The apparatus of claim 1 wherein the boot integrity service is configured to limit functionality of the storage platform by enabling a diagnostic service.

6. The apparatus of claim 1 wherein the boot integrity service is configured to limit functionality of the storage platform by enabling a data collection service.

7. The apparatus of claim 1 wherein the boot integrity service is configured to limit functionality of the storage platform by disabling access by non-service accounts.

8. The apparatus of claim 1 wherein the boot integrity service is configured to limit functionality of the storage platform by protecting a management database.

9. A method implemented in a storage platform that comprises at least one compute node with at least one general purpose processor, memory, a secure cryptoprocessor, and non-volatile storage, the method comprising: obtaining, from the secure cryptoprocessor, observed boot data values comprising:
   a first hash that uniquely represents programs running at load/run BIOS POST;
   a second hash that uniquely represents programs running at load/run bootloader;
   a third hash that uniquely represents programs running at load/run kernel; and
   a fourth hash that uniquely represents the programs running at load/run runlevel programs;
   provide the observed boot data values comprising the first, second, third and fourth hashes as part of platform configuration register content included within a trusted platform quote along with a nonce and an attestation integrity key (AIK) signature, to a remote verifier in a secure remote network that does not contain the storage platform for comparison with expected boot data values; and
   responsive to a control command from the remote verifier generated in response to mismatch between the observed boot data values and the expected boot data values, limiting functionality of the storage platform.

10. The method of claim 9 comprising returning a nonce with the observed boot data values provided to the remote verifier.

11. The method of claim 9 comprising limiting functionality of the storage platform by disabling IO services.

12. The method of claim 9 comprising limiting functionality of the storage platform by disabling remote data replication.

13. The method of claim 9 comprising limiting functionality of the storage platform by enabling a diagnostic service.

14. The method of claim 9 comprising limiting functionality of the storage platform by enabling a data collection service.

15. The method of claim 9 comprising limiting functionality of the storage platform by disabling access by non-service accounts.

16. The method of claim 9 comprising limiting functionality of the storage platform by protecting a management database.

17. A non-transitory computer-readable storage medium storing instructions that when executed by a compute node cause the compute node to perform a method for checking boot integrity, the method comprising: obtaining, from a secure cryptoprocessor, observed boot data values comprising:
   a first hash that uniquely represents programs running at load/run BIOS POST;
   a second hash that uniquely represents programs running at load/run bootloader;
   a third hash that uniquely represents programs running at load/run kernel; and
   a fourth hash that uniquely represents the programs running at load/run runlevel programs;
   provide the observed boot data values comprising the first, second, third and fourth hashes as part of platform configuration register content included within a trusted platform quote along with a nonce and an attestation integrity key (AIK) signature, to a remote verifier in a secure remote network that does not contain the storage platform for comparison with expected boot data values; and
   responsive to a control command from the remote verifier generated in response to mismatch between the observed boot data values and the expected boot data values, limiting functionality of the compute node.

18. The non-transitory computer-readable storage medium of claim 17 wherein limiting functionality of the compute node comprises one or more of: disabling IO services; disabling remote data replication; enabling a diagnostic service; enabling a data collection service; disabling access by non-service accounts; and protecting a management database.

19. The non-transitory computer-readable storage medium of claim 17 comprising, responsive to a control command from the remote verifier generated in response to match between the observed boot data values and the expected boot data values, enabling functionality of the compute node.

20. The non-transitory computer-readable storage medium of claim 17 comprising providing a nonce and an attestation integrity key to the remote verifier with the observed boot data values.

* * * * *

UNITED STATES PATENT AND TRADEMARK OFFICE
CERTIFICATE OF CORRECTION

PATENT NO. : 12,008,109 B2
APPLICATION NO. : 17/577420
DATED : June 11, 2024
INVENTOR(S) : Pierre et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 321 days.

Signed and Sealed this
Twenty-sixth Day of August, 2025

Coke Morgan Stewart
*Acting Director of the United States Patent and Trademark Office*